(12) United States Patent
Wallace et al.

(10) Patent No.: US 11,061,419 B1
(45) Date of Patent: Jul. 13, 2021

(54) SYSTEMS AND METHODS FOR MODIFYING BLEND SEQUENCES WHEN PREPARING FOODSTUFFS

(71) Applicant: Perfect Company, Inc., Vancouver, WA (US)

(72) Inventors: Michael Wayne Wallace, Vancouver, WA (US); Philip Trevor Odom, Portland, OR (US)

(73) Assignee: Perfect Company, Vancouver, WA (US)

( * ) Notice: Subject to any disclaimer, the term of this patent is extended or adjusted under 35 U.S.C. 154(b) by 293 days.

(21) Appl. No.: 15/951,565

(22) Filed: Apr. 12, 2018

(51) Int. Cl.
*B01F 15/00* (2006.01)
*G05D 11/13* (2006.01)
*B01F 3/12* (2006.01)
*A47J 43/042* (2006.01)
*G01G 19/24* (2006.01)
*G01G 19/38* (2006.01)

(52) U.S. Cl.
CPC .......... *G05D 11/134* (2013.01); *A47J 43/042* (2013.01); *B01F 3/1221* (2013.01); *B01F 15/00409* (2013.01); *G01G 19/24* (2013.01); *G01G 19/384* (2013.01); *B01F 15/00253* (2013.01); *B01F 15/00311* (2013.01); *B01F 15/00389* (2013.01); *G05D 11/136* (2013.01); *G05D 11/137* (2013.01)

(58) Field of Classification Search
CPC .................................................. B01F 15/00409
USPC ........................................ 366/141, 206, 601
See application file for complete search history.

(56) References Cited

U.S. PATENT DOCUMENTS

| 2010/0061178 | A1* | 3/2010 | Miyazato | A21C 1/145 366/100 |
| 2014/0272024 | A1* | 9/2014 | Chen | A21C 1/006 426/231 |
| 2015/0164282 | A1* | 6/2015 | Haase | G06F 3/04842 366/145 |
| 2019/0254481 | A1* | 8/2019 | Frielinghaus | A47J 43/046 |

* cited by examiner

*Primary Examiner* — David L Sorkin
(74) *Attorney, Agent, or Firm* — Rylander & Associates, PC; Philip R. M. Hunt (57) ABSTRACT

The systems and methods described herein assist a user in executing a recipe by recording and associating a blend sequence of blend steps with the recipe upon a first execution of the recipe. The systems and methods described herein further assist the user in modifying and executing the recorded blend sequence upon a second and subsequent execution of the recipe.

10 Claims, 7 Drawing Sheets

SYSTEMS AND METHODS FOR MODIFYING BLEND SEQUENCES WHEN PREPARING FOODSTUFFS

BACKGROUND

Recipes are commonly used to prepare foodstuffs, including both solid foodstuffs and liquid foodstuffs. Blending the ingredients recited in a recipe is a common step in executing the recipe. Blending may be performed using a blending apparatus, for example, a mixer, a blender, a food processor, etc. The blending apparatus is generally operated manually by a user executing the recipe. Recently however, automated blending apparatuses have been marketed that execute one or more standard blend sequences, each blend sequence typically comprising one or more intervals of fixed duration with a fixed or time-varying operating parameter for the automated blending apparatus. Such standard blend sequences may not yield optimal results for every recipe and often a user may prefer to utilize a specific blend sequence for a given recipe. This burdens the user with performing, each time the recipe is executed, a specific sequence of blend steps, each blend step having a specific duration, to operate the blending apparatus to yield a desired blending result.

A blending apparatus may provide the capability to record and playback a specific sequence of blend steps. Recording and playing back a sequence of blend steps may suffice for a single recipe, provided the amount of material being blended does not vary. However, a user executing a recipe may opt to utilize a greater or lesser amount of ingredients to yield more or fewer servings of the recipe, resulting in a variation in the amount of ingredients being blended. This may necessitate a change in the sequence or content of one or more blend steps in a blend sequence. Therefore, for optimal blending results, even with a given recipe and a specific blend sequence, the steps of a blend sequence for the given recipe may need to be modified based upon the amount of recipe ingredients being blended.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims.

When appropriate, like reference materials and characters are used to designate identical, corresponding, or similar components in different figures. The figures associated with this disclosure typically are not drawn with dimensional accuracy to scale, i.e., such drawings have been drafted with a focus on clarity of viewing and understanding rather than dimensional accuracy.

The headings used herein are for organizational purposes only and are not meant to be used to limit the scope of the description or the claims. As used throughout this application, the word "can" is used in a permissive sense (i.e., meaning having the potential to), rather than the mandatory sense (i.e., meaning must.) Similarly, the words "include,", "including," and "includes" mean including, but not limited to. In addition, use of directional terms such as "upper," "lower," "above," "underneath," and so forth, are intended to describe the positions and/or orientations of various components of the invention relative to one another as shown in the various figures and are not intended to impose limitation on any position and/or orientation of any embodiment of the invention relative to any reference point external to the reference.

DETAILED DESCRIPTION

The following detailed description is directed to systems and methods for modifying blend sequences when preparing foodstuffs from recipes. In particular, the disclosure is directed to, among other things, example systems and example methods for executing a recipe comprising one or more ingredients, utilizing a computing device, a measurement device such as a scale, and a blending device, by measuring a first amount of ingredients utilized when executing a recipe; recording a blend sequence of blend steps, associating the recording and the first measured amount of ingredients with the recipe, measuring a second amount of ingredients utilized when executing the recipe, modifying the blend sequence of blend steps associated with the recipe based on the first measured amount and the second measured amount, and playing back the modified sequence of blend steps to blend the second amount of ingredients.

Examples of the present disclosure are further directed to, among other things, recording a blend sequence of blend steps by measuring and storing, for each blend step in the blend sequence, a temporal duration and a value of an operating parameter of the blending apparatus, as the blending apparatus is operated.

Examples of the present disclosure are further directed to, among other things, recording a blend sequence of blend steps by measuring and storing, for each blend step in the blend sequence, a temporal duration and one of a constant value or a temporal sequence of values for an operating parameter of the blending apparatus, as the blending apparatus is operated.

Examples of the present disclosure are further directed to, among other things, recording a blend sequence of blend steps by an operator creating, using an interface on the computing device, a sequence of one or more blend steps, each blend step stipulating a temporal duration and a value of an operating parameter for the blending device.

Examples of the present disclosure are further directed to, among other things, recording a blend sequence of blend steps by an operator creating, using an interface on the computing device, a sequence of one or more blend step, each blend step stipulating a temporal duration and a constant value or a temporal sequence of values for an operating parameter of the blending device.

Examples of the present disclosure are further directed to, among other things, systems and methods for measuring an amount of an ingredient by measuring a weight or volume of the ingredient.

Examples of the present disclosure are further directed to, among other things, systems and methods of modifying a blend sequence of blend steps by adjusting the duration of one or more blend steps in the blend sequence by a ratio of the second total amount of ingredients to the first total amount of ingredients.

Examples of the present disclosure are further directed to, among other things, systems and methods of modifying a blend sequence of blend steps by adjust the operating parameter of one or more blend steps in the blend sequence by a ratio of the second total amount of ingredients to the first total amount of ingredients.

Examples of the present disclosure are further directed to, among other things, systems and methods where the blending apparatus is a blender.

Examples of the present disclosure are further directed to, among other things, systems and methods where the operating parameter of each step of a blend sequence is a rotatory speed of the blender, and the modification of the blend sequence is performed by adjusting the rotatory speed of the blender in accordance with the ratio of the total of the second total amount of ingredients to the first total amount of ingredients.

As used in this document, a "foodstuff" is any substance that can be consumed as food. A foodstuff may be a single raw item such as milk, juice, an apple or a pear. A foodstuff may be a single raw item that has been processed or prepared in some manner, such as a hard-boiled egg. A foodstuff may be an aggregation of ingredients prepared according to a recipe. The ingredients of a foodstuff may be liquids, solids, gels, suspensions, or combinations of such substances.

As used in this document, a "recipe" is a compilation of steps undertaken to prepare a foodstuff from one or more ingredients. A recipe commonly lists one or more ingredients, each of which may be associated with a quantity which may be specified with greater or lesser precision. Listing an ingredient in a recipe implies the step of measuring that ingredient. As used herein, a "recipe mixture" comprises two or more ingredients admixed together. A recipe may involve more than one recipe mixture, and two recipe mixtures may be admixed to create a further recipe mixture.

Successive operations in a recipe are herein termed "recipe steps". A recipe step may be for example the measurement of a quantity of a substance, herein termed an "ingredient step". Additional recipe steps, herein termed "action steps", may include for example irreversibly mixing ingredients together; physically altering one or a combination of ingredients through a process such as blending, sautéing, baking, or the like; and mingling ingredients or sets of ingredients without admixture. An action step may comprise manipulating a device preparatory to a further recipe step, for example, preheating an oven preparatory to baking an assemblage of recipe ingredients. An action step may comprise utilizing a device to perform an action upon one or more ingredients, such as baking a cake mix. A recipe application employing a user interface to display a recipe for execution may display each action step within a delimited region of the user interface; each such delimited region is termed herein a "recipe block". The appearance of a recipe block may be altered by a recipe application to provide feedback to the user of the recipe application as to the completion status of the corresponding recipe step.

As used herein, the terms "execute", "executing", "execution" and the like refer to the successive completion of one or a sequence of recipe steps comprising a recipe.

As used herein, the terms "measure", "measuring", and "measurement" when applied to an ingredient of a recipe refer to monitoring and recording the weight and/or volume of the quantity of the ingredient utilized when executing the recipe.

As used herein, the terms "blend", "mix", "blending", "mixing" and the like refer to the process of physically intermingling ingredients together in an irreversible manner. A "blending device" or "blending apparatus" is a mechanism employing a motor or the like that performs a blending or mixing operation and can be externally monitored and controlled. Examples of such an apparatus may include a mixer using beaters; a blender using blades; a grinder using abrasive wheels, disks or plates; a vibrator using a closed or open container; or the like. Such an apparatus may be designed for home and/or commercial use, and may be employed in a home, commercial, industrial, or other environment. A recipe step involving the use of a blending apparatus is termed herein a "blend action step" or simply a "blend action".

As used herein, the term "blend step" (or simply "step") refers to a single period of operation of a blending apparatus, characterized by a temporal duration and a value for one or more operating parameters for the apparatus, each value being a constant value or a value that varies with time during the duration of the step. Examples of such an operating parameter may include, for example, the rotatory rate, power, frequency, linear velocity, or other similar measure of operation of the blending apparatus. As used herein, the term "blend sequence" (or simply "sequence") refers to an ordered sequence of one or more blend steps. "Recording" a blend sequence refers to the specification or measurement, for each step of the sequence, of temporal information and the value(s) of the one or more operating parameters, and/or other operational data, associated with the step. The recorded data for a blend sequence may include additional data relevant to the sequence as a whole and/or one or more steps of the sequence. "Playing back" a blend sequence on a blending apparatus refers to the process of executing, in order, each of the successive steps of the blend sequence, for the given temporal duration of the step, utilizing the values of the one or more operating parameters associated with the step to control the operation of the blending apparatus. Playing back a blend sequence may also involve providing additional data recorded with the blend sequence to a blending apparatus or other apparatus or system to facilitate the reproduction of the blend sequence as recorded. Recording a blend step may further include the specification or measurement of a temporal interval since the previous blend step if any, and playing back a blend step may include pausing for the duration of the recorded temporal interval before controlling the operation of the blending apparatus.

Figure 1:
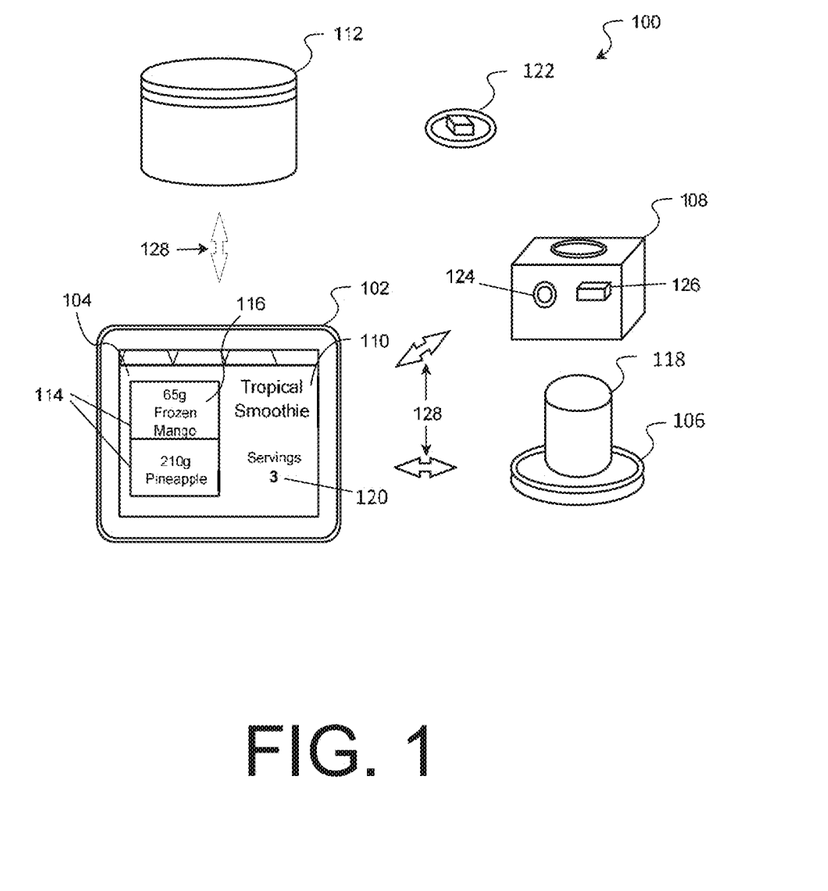
FIG. 1 depicts an example embodiment of the current inventive system for preparing a foodstuff.

FIG. 1 depicts an example view of an implementation of a system 100 configured to execute a recipe to prepare a foodstuff in accordance with an aspect of the current invention. A computing device 102 may execute a recipe application 104 configured to display and execute a recipe, record a blend sequence, and playback a blend sequence. The computing device 102 may be, for example, a tablet computer, a laptop computer, a personal data assistant, a smart phone, or any similar device capable of displaying a graphical user interface and communicating with smart appliances such as a scale 106 and a blending apparatus 108. A user may utilize the computing device 102 to view a recipe 110 that may include recipe data, which may be present in a memory (not illustrated) of the user computing device 102 or may be retrieved from a recipe server 112. The recipe server 112 may be a private database server, a public database server, a corporate database server, a private Internet server, a public Internet server, a corporate Internet or intranet server, or other similar server. The recipe server 112 may serve a single user or a group of users. The recipe server 112 may store recipes and/or recipe data private to a single user, or shared by multiple users.

As an example, the recipe 110 may include recipe data for a foodstuff referred to as 'Tropical Smoothie' and may comprise a sequence of recipe steps 114, some of which may specify one or more ingredients by identity and weight, and some of which may specify actions to be taken by a user executing the recipe 110. In this example recipe 110, a recipe step 116 specifies an ingredient 'Frozen Mango' with a desired weight of '65 g.' A user may follow the recipe steps 114 of the recipe 104 to aggregate ingredients, utilizing the scale 106 to weigh the ingredients as specified in the recipe. Each ingredient may be added in sequence to a blending container 118 previously placed on the scale 106. As each ingredient is added to the blending container 118, the scale 110 may measure the weight and communicate the actual weight of each ingredient to the computing device 102. The computing device 102 may record the actual weight of each weighed ingredient. The computing device 102 may further record a number of servings 120 of the recipe being executed.

Once each of the ingredients of the recipe 110 are measured into the blending container 118, the user may place a blending container cover 122 onto the blending container 118 and place the blending container 118 onto the blending apparatus 108. The recipe ingredients are now ready for blending. In this example, operation of the blending apparatus 108 may be controlled by means of a power selector 124 and a power switch 126. The power selector 124 may control the speed of the blending apparatus 108 and the power switch 126 may activate the blending apparatus 108.

In a configuration, the blending apparatus 108 may be capable of communicating its operating state to an external device, e.g., the computing device 102, and may be capable of being controlled remotely by the external device. Alternatively and equivalently, the blending apparatus 108 may be capable of communicating its operating state to an external device, e.g., the computing device 102, and may be capable of receiving, storing and executing a blend sequence comprising a sequence of blend steps from the external device. In a configuration, the computing device 102 and/or the scale 110 may be part of the blending apparatus 108.

Communications between the computing device 102 and the scale 110, the blending apparatus 108, and the recipe server 112, depicted schematically in FIG. 1 as 128, may be by any wired or wireless means as are well known in the art.

Figure 2:
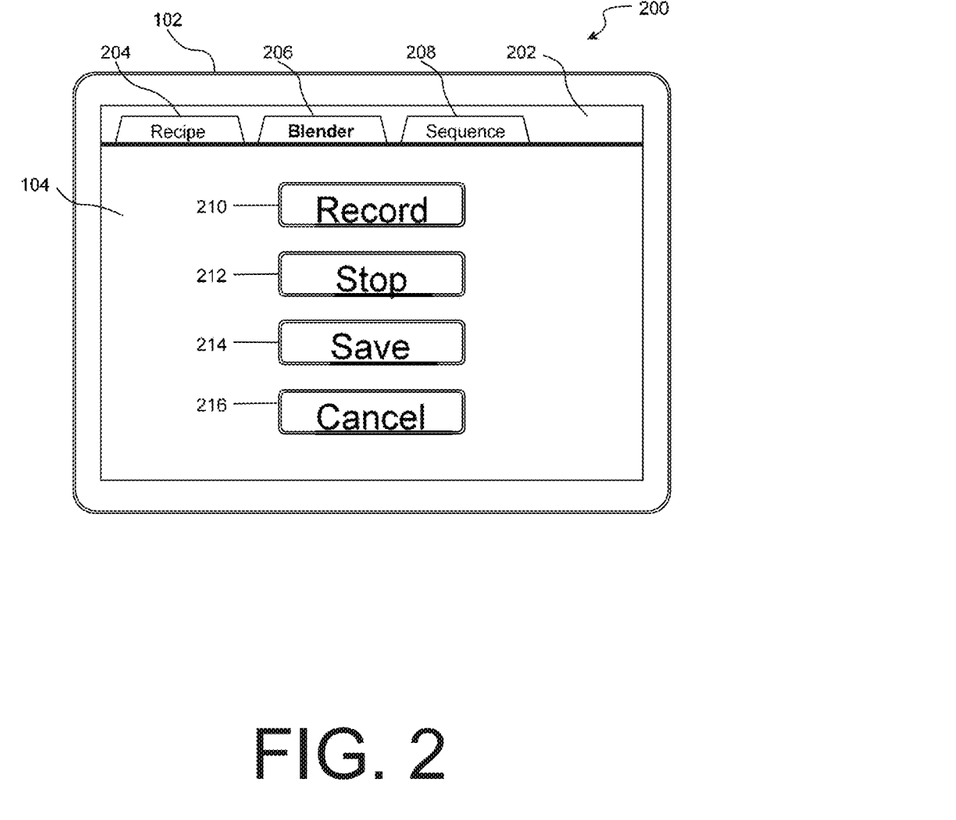
FIG. 2 depicts an example implementation of a user interface of a recipe application configured to record a blend sequence.

FIG. 2 depicts an example configuration 200 of a user interface 202 presented on the computing device 102 by the recipe application 104 suitable for recording and controlling the blending of ingredients of a recipe, e.g., the recipe 110. The user interface 202 presents a Recipe tab 204 to select an interface to view and execute the recipe 110, a Blender tab 206 to select an interface to record and playback a blend sequence, and a Sequence tab 208 to select an interface to manipulate the contents of a blend sequence. After executing steps of the recipe 110, e.g., adding the ingredients to the blending container 118, and prior to blending the ingredients of the recipe 110, a user may desire to record a unique blend sequence utilized to blend the ingredients of the recipe 110, e.g., a blend sequence not specifically recited by the recipe 110. The user may record a blend sequence by interacting with the Blender tab 206, interacting with a Record icon 210 and operating the blending apparatus 108, for example by using the power selector 124 and/or the power switch 126. The power selector 124 may control the operation of the blending apparatus 108 by, for example, adjusting the power output of a motor (not illustrated) of the blending apparatus 108, a rotatory speed of the motor of the blending apparatus 108, or some other operating parameter of the blending apparatus 108. The power selector 124 may control the operation of the blending apparatus 108 by controlling multiple parameters of the blending apparatus 108. Additionally, the power switch 126 may control the operation of blending apparatus 108 by, for example, activating and deactivating the motor of the blending apparatus 108.

In a configuration, a user may create a blend step by setting the power selector 124 to a given power setting, setting the power switch 126 to the 'on' position for a period of time, then setting the power switch 126 to the 'off' position. For each blend step, the computing device 102 may record the setting of power selector 124 and the length of time the power switch 126 was in the 'on' position. The user may create a further blend step by waiting for a period of time before changing the position of the power selector 124 to a different position, and activating the power switch 126 for an additional period of time. For each blend step, the computing device 102 may record the time delay since termination of a previous blend step, if any.

Once the user has created a blend sequence by manually executing a series of one or more blend steps, each of which is recorded by the computing device 102, the user may interact with a Stop icon 212 to terminate the blend sequence. Once a blend sequence has been terminated, the user may interact with a Save icon 214, which causes the computing device 102 to store the recorded blend sequence with the current recipe 110, in association with the recorded actual weights of the ingredients. The user may interact with a Cancel icon 216 to cancel a recording.

In an example configuration of the system 100, the recipe application 104 may store the data for a blend step by using a data structure comprising an unsigned integer number of clock increments, for example ticks of a 30 Hz clock, denoting the temporal offset of the start of the blend step from the beginning of the recording of the blend sequence; an integer or real value denoting a parameter value for blend operation during this blend step, for example, the setting of the power controller 124; and an unsigned integer number of clock increments denoting the duration of this blend step. In this configuration, a blend sequence may be an ordered list of such data structures.

In a configuration of the system 100, the recipe application 104 may store the data for each blend step in a sequence of data structures, one representing one of a continuous sequence of finite time intervals of a fixed duration (such as 0.1 second), each data structure comprising a Boolean value signaling whether the blending apparatus 108 was operating (true) or not operating (false) during this time step, and an integer or real value denoting a parameter value for blend operation during this time step, for example, the setting of the power controller 124. In this configuration, a blend sequence may be an ordered list of such data structures.

In another configuration of the system 100, the recipe application 104 may store the data for a blend sequence as a series of data structures, one data structure for each state transition in the operation of a blending apparatus 108. In this configuration, a data structure may comprise an unsigned integer number of clock increments, for example ticks of a 30 Hz clock, denoting the temporal offset of the occurrence of the state transition from the beginning of the blend sequence, and an integer or real parameter denoting a parameter value for blending apparatus operation following the state transition, for example, the setting of the power controller 124, where a parameter value of zero (0) denotes the blending apparatus 118 transitioning to an 'off' state. In this configuration, a blend sequence may be an ordered list of such data structures.

In a configuration of the system 100, the blending apparatus 108 may be capable of detecting an identity of the blending container 118 and conveying such identity to the recipe application 104 executing on the computing device 102. The identity of the blending container 118 may be stored with a recorded blend sequence, making the blend sequence specific to the blending container 118 and restricting playback of the recorded blend sequence to circumstances where the user is executing a recipe, e.g., the recipe 110, and utilizing the same style, type and size of blending container as identified by the blending apparatus 108. In this example configuration, a data structure utilized to store a blend step may comprise an enumeration value denoting the style, type and size of the blending container utilized in the blend step. Alternatively, a separate data structure comprising an enumeration value denoting the style, type and size of the blending container utilized in a blend sequence may be associated with an ordered list of blend step data structures.

In the above description, operation of the blending apparatus 108 is accomplished by use of the power selector 124 and the power switch 126, and a parameter value utilized to record a blend step is the setting of the power selector 124. In another configuration, operation of the blending apparatus 108 may be through a single control that turns the blending apparatus 108 on or off. In this configuration, no parameter value need be stored for a blend step. In another configuration, operation of the blending apparatus 108 may be through a multi-position switch, e.g., a three-position switch selecting among 'off', 'low-speed', and 'high-speed' conditions. In this configuration, the parameter value stored for a blend step may be an enumeration denoting one of 'off, low-speed' or 'high-speed.' In configurations, the multi-position switch may include more than three positions and the parameter value stored for a blend step may be an enumeration denoting one of the multiple positions.

In a configuration, operation of the blending apparatus 108 may be through an analog or digital speed control with multiple discrete settings, for example, settings from 1 to 10 inclusive, with 10 being the highest speed. In such a configuration, the parameter value stored for a blend step may be an enumeration denoting one of an enumeration of values corresponding to each of the multiple discrete settings.

In configurations, operation of the blending apparatus 108 may be through a pulse control, which may be in addition or as an alternative to the power selector 124 and/or the power switch 126. In such configurations of the blending apparatus 108, continued interaction with a pulse control may result in a sequence of blending apparatus operations at a defined temporal spacing; the temporal spacing may be under the control of the power selector 124 or another control. In such configurations, the recipe application 104 may store the data for a blend step by using a data structure comprising an unsigned integer number of clock increments, for example ticks of a 30 Hz clock, denoting the temporal offset of the start of the blend step from the beginning of the recording of the blend sequence; an integer or real value denoting a parameter value for blending apparatus operation during this blend step, for example, the setting of the power controller 124; an unsigned integer number of clock increments denoting the duration of a pulse; an unsigned integer number of clock increments denoting the delay between pulses; and an unsigned number of pulses. Alternatively, when a blending apparatus 118 utilizes a single predefined duty cycle for pulsatile operation, a recipe application 104 may store the data for a blend step by using a data structure comprising an unsigned integer number of clock increments, for example ticks of a 30 Hz clock, denoting the temporal offset of the start of the blend step from the beginning of the recording of the blend sequence; an integer or real value denoting a parameter value for blending apparatus operation during this blend step, for example, the setting of the power controller 124; and an unsigned integer denoting the number of pulses in the blend step.

In a configuration, operation of the blending apparatus 108 may be by means of the power selector 124 that sets the rotational speed of the blending apparatus 108. In this alternative embodiment, the recipe application 104 may store the data for a blend step by using a parameter value that reflects the target rotational speed of the blending apparatus 108. In such a circumstance, the resulting blend sequence may be utilized on a second blending apparatus (not illustrated) that may be at least similar to, or even identical to, the blending apparatus 108 and that has the same or a different control configuration, provided the second blending apparatus is configured to be remotely operated or remotely prompted by a computing device, e.g., the computing device 102, to execute a blend sequence comprising a sequence of blend steps, each of which specifies a target rotational speed of the second blending apparatus.

In another configuration, operation of the blending apparatus 108 may be by means of the power selector 124 that sets the rotational speed of the blending apparatus 108, and blending apparatus 108 may provide a capability to report the actual rotational speed of the motor of the blending apparatus 108. In such a configuration, the recipe application 104 may store the data for a blend step by using a parameter value which reflects the actual rotational speed of the blending apparatus 108. In this circumstance, the resulting blend sequence may be utilized on a second blending apparatus (not illustrated) that may be at least similar to, or even identical to, the blending apparatus 108 and that has the same or a different control configuration, provided the second blending apparatus is configured to be remotely operated or remotely prompted to execute a blend sequence comprising a sequence of blend steps, each of which specifies an actual rotational speed of the blending apparatus 108.

In a configuration, the blending apparatus 108 may be configured without any controls, but may be configured to receive data from an external device, such as, for example, the computing device 102, to control operation of the blending apparatus 108, and to communicate data regarding the operational state of the blending apparatus 108 to the external device. In such a configuration, the recipe application 104 executing on the computing device 102 may present a user interface comprising control icons, for example, a power selector control icon and a power switch icon, activation of which on the user interface results in operation of the blending apparatus 108 in accordance with the settings and functions of the control icons. In such a configuration, the recipe application 104 may record data regarding actions by a user and state data for each control icon as the user manipulates the various elements of the user interface to effect operation of the blending apparatus 108, as the user proceeds to generate the steps of the blend sequence through interactions with the user interface.

In each of the example configurations previously described, the recipe application 104 may gather and store additional information beyond the blend sequence executed by the user. For example, the recipe application 104 may be configured to store various characteristics of a blending apparatus 108 used to generate the blend sequence, such as make, model, size, age, power rating, or other similar characteristics. The recipe application 104 may be configured to store information regarding the blending container 118 and/or the blending container cover 122 such as make, model, size, material, dimensions, or other similar characteristics.

In each of the example configurations previously described, the blending apparatus 108 may be capable of detecting and signaling whether a blending container cover 122 is present on a blending container 118 placed on the blending apparatus 108. In this circumstance, the recipe application 104 may be configured to store such detection with the data for a blend step, and may be configured to report such condition to a user when a blend sequence is played back.

A recorded blend sequence may be specific to a particular user, or may be shared among multiple users. A recorded blend sequence associated with a recipe, e.g., the recipe 110, by a first user may be replaced with a different blend sequence created by a second user. A recorded blend sequence may be associated with a recipe, e.g., the recipe 110, on the computing device 102, while a different recorded blend sequence may be associated with the recipe, e.g., the recipe 110, on the recipe server 112. A recorded blend sequence stored by a first user on a first computing device 102 may be shared with a second computing device (not illustrated) operated by a second user.

As previously noted, FIG. 2 depicts an example user interface 202 for recording and playing back a blend sequence. In certain configurations, other methods and systems may be used for starting, stopping, saving, modifying, deleting, and playing back a blend sequence. For example, in a configuration, the computing device 102 may incorporate an audio receiving device such as an internal or external microphone configured to receive voice commands, and the recipe application 104 may utilize such audio input to control starting, stopping, saving, modifying, deleting, and/or playing back a blend sequence, as a complement or replacement for visual user interface controls. Also, in certain configurations, the blending apparatus 108 may be configured with a control that when activated signals the recipe application 104 to begin recording operational data received from the blending apparatus 108. The generation of such a signal may be primary to the control, or may be secondary to another primary function of the control.

When the recipe application 104 receives a signal to start recording a blend sequence, the recipe application 104 may not commence receiving and storing data for the first blend step immediately, but may monitor data until receiving an indication that a blending apparatus 118 has been activated. In this manner, the recipe application 104 may avoid the incorporation of meaningless dead time at the beginning of a blend sequence.

In a further configuration of the recipe application 104, the recipe application 104 may continuously monitor operational data received from a blending apparatus 118, and may begin to store blend steps when the recipe application 104 detects that the blending apparatus 118 has been activated. The recipe application 104 may present a visual indicator of the status of a blending apparatus 118 and may provide a visual and/or auditory signal to alert a user when recording of blend steps has commenced.

FIG. 2 further depicts a Stop icon 212 configured to stop the recording of a blend sequence. In a configuration, the recipe application 104 may be configured to utilize additional or alternative means for determining the termination of a blend sequence. For example, the recipe application 104 may detect, following a period of activation of the blending apparatus 108, a period of inactivity during which the blending apparatus 108 has not been activated, and may terminate the blend sequence based upon such detection. As a further example, many blend sequences involve a series of initial short steps or pulses with low power settings, followed by an extended period of blending with a higher power setting. In an alternative embodiment, the recipe application 104 may detect a prolonged period of activation of the blending apparatus 108 at a constant operational state, and upon detecting the end of such prolonged period of activation, terminate the blend sequence based on such detection. In a configuration, the blending apparatus 108 may be configured to detect and signal the presence of the blending container 118, and the recipe application 104 may detect the removal of the blending container 118 from the blending apparatus 108 during the recording of a sequence of blend steps, and terminate the blend sequence upon such detection.

The recipe application 104 may provide the capability of discarding any blend step or data signaling a period of inactivity at the end of a blend sequence, since such inactivity is generally irrelevant to achieving a proper blending operation on a recipe, e.g., recipe 110, provided by the recipe application 104.

The recipe application 104 may provide the user with a capability to examine, modify, rearrange, delete, or save any or all of the recorded blend steps.

A person skilled in the art will recognize that the example user interface 202 depicted in FIG. 2 is only one example of a user interface configured to provide functionality for recording and saving a blend sequence, and that other user interfaces and corresponding methods well known in the art may be employed to perform the same or similar functions without deviating from the spirit and intent of the methods and systems described herein.

Figure 3:
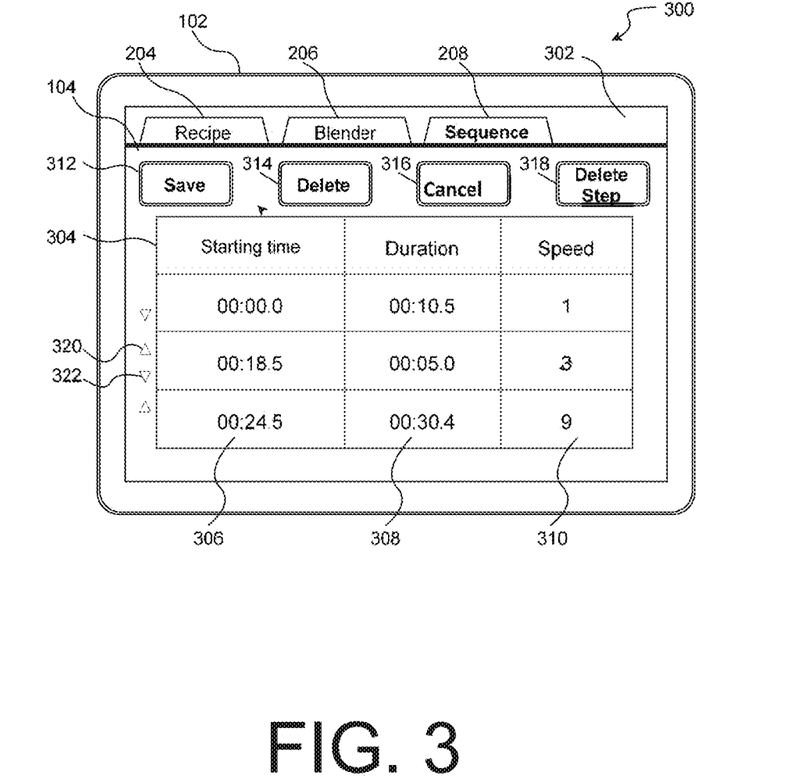
FIG. 3 depicts an example implementation of a user interface for a recipe application configured to edit a blend sequence.

FIG. 3 depicts an example configuration 300 of a user interface 302 presented on the computing device 102 by the recipe application 104 suitable for manipulating the steps of a blend sequence. The user interface 302 displays a table 304 comprising example blend steps of an example blend sequence. In the example interface 302, each blend step comprises a starting time 306 encoded as a time value denoting the offset of the blend step from the start of the blend sequence; a duration 308 encoded as a time value; and a speed 310 encoded as a blending apparatus 108 control parameter. The user interface 302 further comprises a Save icon 312 configured to save a blend sequence when a user interacts with the Stop icon 312, a Delete icon 314 configured to delete an entire blend sequence when a user interacts with the Delete icon 314, a Cancel icon 316 configured to cancel a current edit of a blend sequence when a user interacts with the Cancel icon 316, and a Delete Step button 318 configured to delete a currently-selected blend step when a user interacts with the Delete step icon 318. The user interface 302 further comprises icons 320, 322 to control the ordering of the blend steps. In particular, the icon 320 may move a blend step up (earlier) in the blend sequence when a user interacts with the icon 320, and the icon 322 may move a blend step down (later) in the blend sequence when a user interacts with the icon 322.

In such a configuration, upon a user interacting with the Sequence tab 208, the user interface 302 may display the blend steps comprising the most-recently-recorded blend sequence. The user may save the blend sequence by interacting with, e.g., touching, the Save icon 312. The user may edit the contents of a blend step by selecting a table cell by interacting with a table cell e.g., touching the table cell, and typing in a replacement value for the contents of the table cell on the computing device 102. The user may rearrange the sequence of blend steps by interacting with the icon 320 to move the corresponding blend step up (earlier) in the blend sequence, or by interacting with the icon 322 to move the corresponding blend step down (later) in the blend sequence. The user may delete a blend step by selecting a table cell and touching the Delete Step icon 318. The user may cancel the current editing session by pressing the Cancel icon 316.

In such a configuration, as shown in table 304, the starting time offset of a blend step (for example, the second step in the example blend sequence illustrated in FIG. 3) is equal to the sum of the starting time offset of the previous blend step (if any), the duration of the previous blend step, and an inter-step interval (not displayed). The recipe application 104 may be configured to permit editing of a blend sequence and thus may automatically modify the starting times of two blend steps that are interchanged to create a blend sequence such that the inter-step intervals for each modified blend step are the same as the corresponding blend steps prior to the interchange. For example, in the example blend sequence depicted in FIG. 3, there is an interval of 8.0 seconds between the first blend step and the second blend step, and an interval of 1.0 second between the second blend step and the third blend step. If a user interchanged the first and second blend steps, the recipe application 104 might maintain the interval after the first blend step and the interval after the second blend step by setting the starting time of the (new) first step to 00:00.0, and the starting time of the (new) second step to 00:06.0. This would result in an interval of 1.0 second between the new first blend step and the new second blend step, and an interval of 8.0 seconds between the new second blend step and the third blend step. Alternatively, the recipe application 104 may maintain the interval between blend steps by setting the starting time of the (new) first blend step to 00:00.0 and the starting time of the (new) second blend step to 00:13.0. This would result in an interval of 8.0 seconds between the new first blend step and the new second blend step, and an interval of 1.0 second between the new second blend step and the third blend step.

A person skilled in the art will recognize that the example user interface 302 depicted in FIG. 3 is only one example of a user interface configured to provide functionality for displaying, modifying, rearranging, saving and deleting a blend sequence, and that other user interfaces and corresponding methods well known in the art may be employed to perform the same or similar functions without deviating from the spirit and intent of the methods and systems described herein.

Figure 4A:
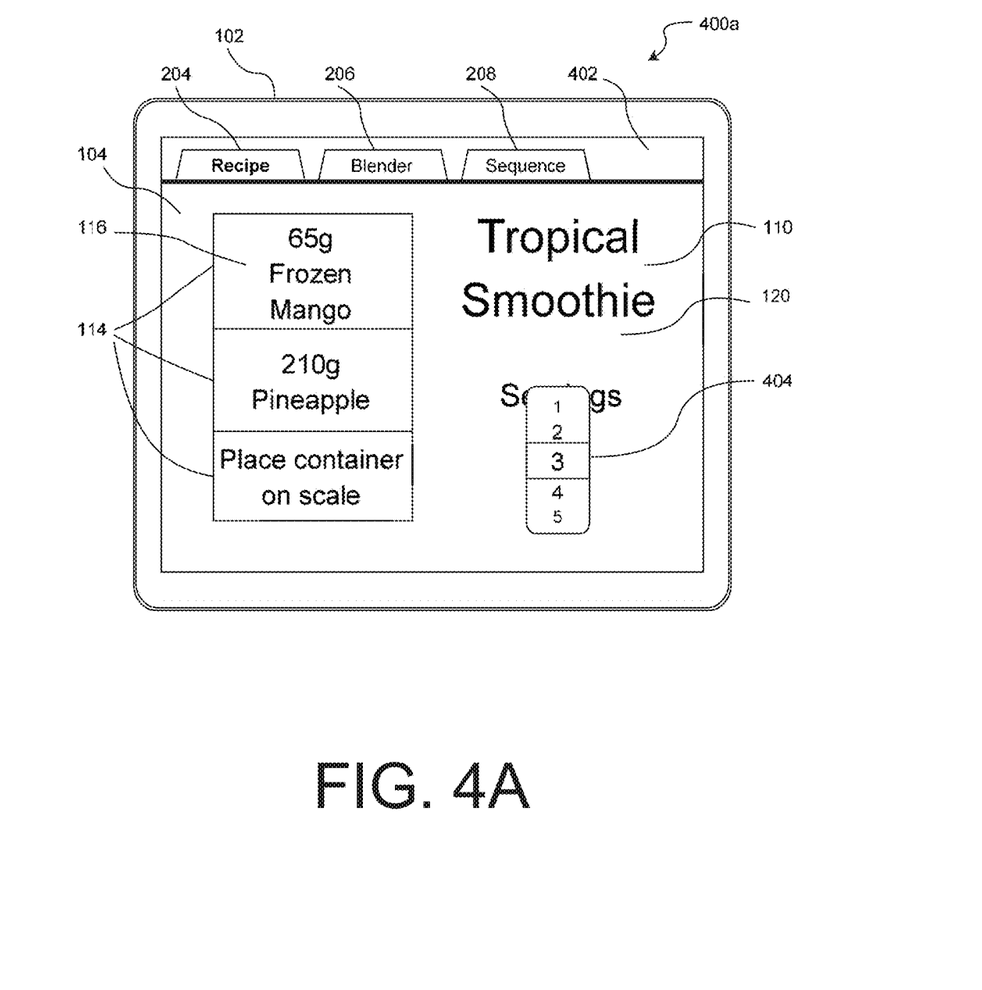
FIG. 4A depicts an example implementation of a user interface of a recipe application configured to modify the number of servings to be created when executing a recipe.

FIG. 4A depicts an example configuration 400*a* of a user interface 402, presented by a recipe application 104 executing on the computing device 102, for modifying the number of servings to be created when executing a recipe, e.g., recipe 110, provided by the recipe application 104. When a user interacts with the Servings icon 120, a rotary selector icon 404 may be displayed, which allows the user to select a desired number of servings by interacting with the rotary selector icon 404. One skilled in the art will recognize that other user interface techniques may be utilized to allow specification of the desired number of servings, including for example a text entry widget, a drop-down list, or other similar methods. All such variations are within the scope of the methods and systems described herein.

Once a desired number of servings is chosen, the computing device 102 may modify the display of the recipe steps 114 to present a new set of required weights for the ingredients of the recipe 110. For example, if a recipe step 114 specified an ingredient 116 'Frozen Mango' in an amount of '65 g' (65 grams) for a serving count of 3, the display of recipe step 116 may be modified to specify the ingredient 'Frozen Mango' in an amount of '86.7 g' (86.7 grams) for a serving count of 4.

Figure 4B:
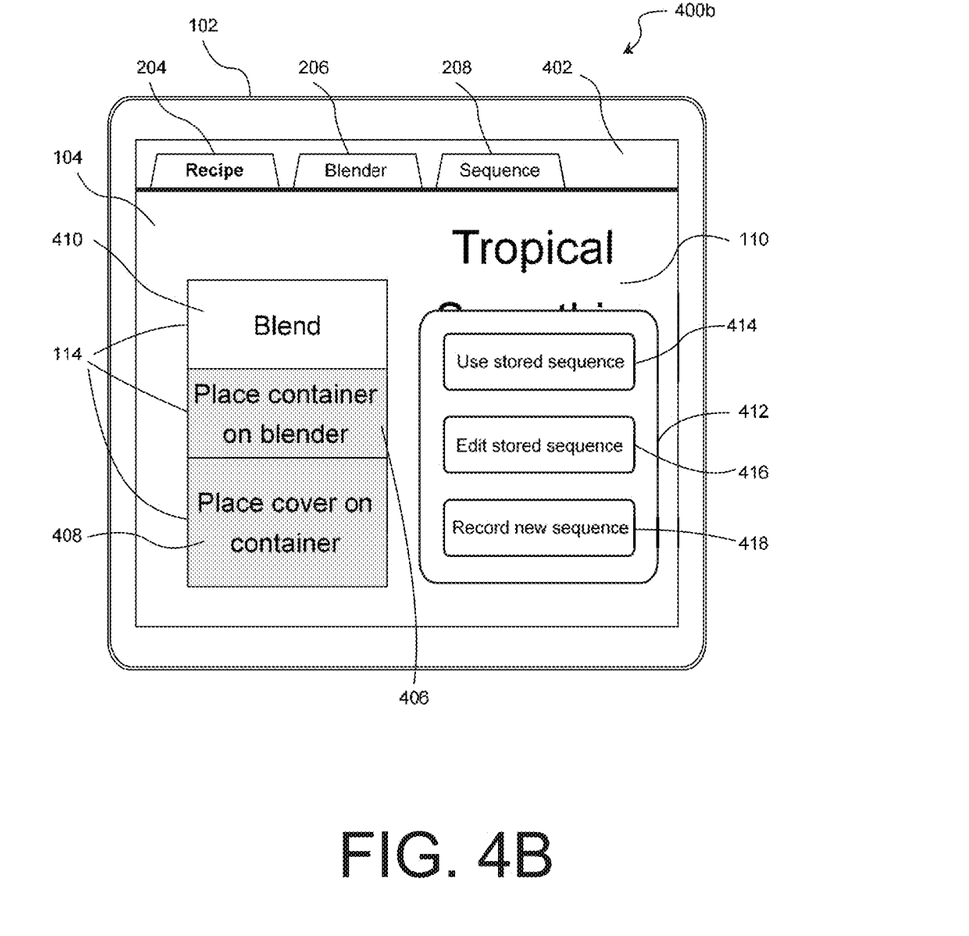
FIG. 4B depicts an example implementation of a user interface of a recipe application configured to perform a blend step when executing a recipe.

FIG. 4B depicts an example configuration 400*b* of the user interface 402, presented by the recipe application 104 executing on the computing device 102, for executing a recipe, e.g., the recipe 110. At the depicted intermediate stage of executing the recipe 110, action steps 406 and 408 have been completed, as may be indicated by hatching, coloring, or other modification to the background of the corresponding recipe blocks 114. Action step 410, which is a blend action step, is the next recipe step 114 to be executed. The recipe application 104 may display a popup dialog 412 presenting a user with options to use a stored blend sequence (icon 414), edit a stored blend sequence (icon 416), and record a new blend sequence (icon 418).

Utilizing systems and methods as described herein to execute a recipe 110, a user may choose a desired number of servings as previously described with respect to the interface 402 in FIG. 4A. Changing the number of servings 120 from a previous or default setting may cause the recipe application 104 to modify the amounts for each ingredient in accordance with the change in the number of servings, and to display the modified amounts in the corresponding recipe steps 114. The user may then proceed to execute the recipe steps 114 comprising recipe 110. The user may place the blending container 118 on the scale 106 and proceed to weigh out the required ingredients in the amounts specified by the modified display of recipe 110. As ingredients are weighed, the computing device 102 records the weights. Once the ingredients of the recipe 110 are measured into the blending container 118, the user may, performing recipe steps 406 and 408 as displayed on the user interface 402 in FIG. 4B, place the blending container cover 122 onto the blending container 118 and place the blending container 118 onto the blending apparatus 108. After executing these two recipe steps 406, 408, the recipe ingredient mixture is ready for blending, and a popup dialog 412 is presented to the user to facilitate accomplishing the blend action step 410. The user may utilize a stored blend sequence to control the operation of the blending apparatus 108 by interacting with the icon 414, e.g., pressing the icon 414, and the recipe application 104 may modify the stored blend sequence in accordance with the weight data stored when the user initially executed the recipe 110 and created the stored blend sequence, and in accordance with the weight data recorded with the new execution of the recipe 110, and may execute the modified blend sequence to accomplish the blend action step 410. Alternatively, the user may edit a stored blend sequence by interacting with the icon 416, which may cause an interface as illustrated in FIG. 3 to be displayed for user interaction, following which the recipe application 104 may modify the edited blend sequence in accordance with the weight data stored when the user initially executed the recipe 110 and created the stored blend sequence, and in accordance with the weight data recorded with the new execution of the recipe 110, and may execute the modified edited blend sequence to accomplish the blend action step 410. As a further alternative, the user may record a new blend sequence by interacting with the icon 418, which may present an interface as illustrated in FIG. 2 for user interaction to record a blend sequence and thereby accomplish the blend action step 410.

A person skilled in the art will recognize that the example user interface 402 depicted in FIGS. 4A and 4B is only one example of a user interface configured to provide functionality for executing a recipe and recording, editing and utilizing blend sequences, and that other user interfaces and corresponding methods well known in the art may be employed to perform the same or similar functions without deviating from the spirit and intent of the methods and systems describe herein.

Figure 5:
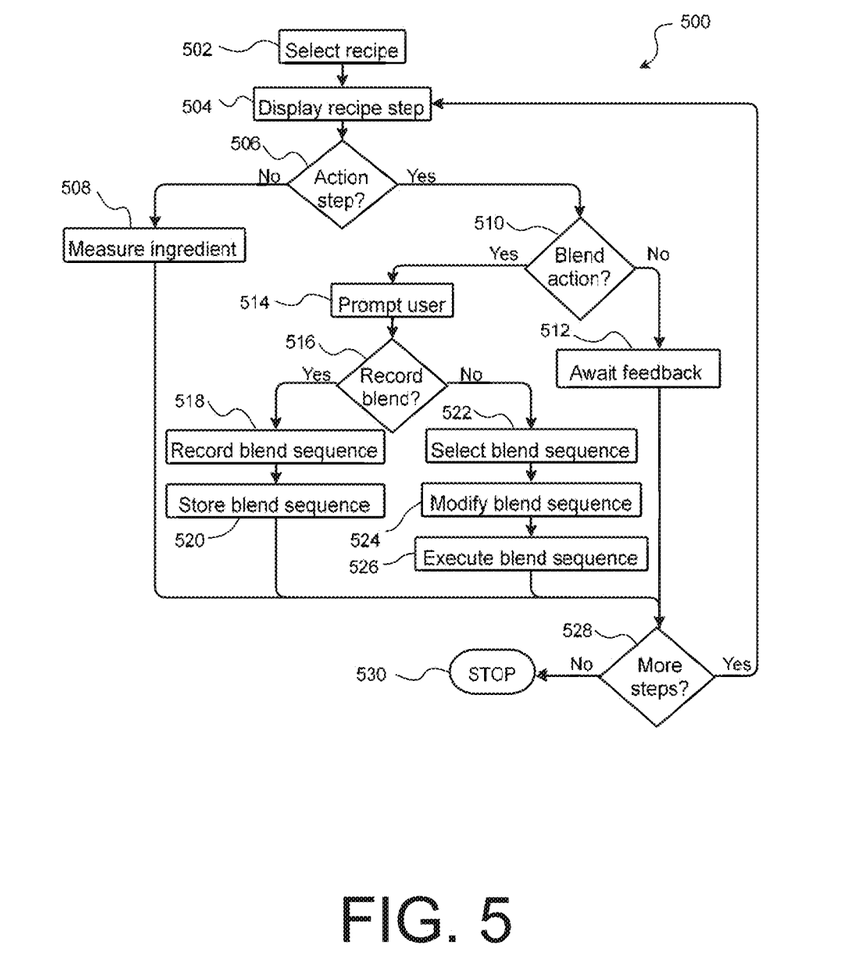
FIG. 5 depicts a flowchart of an example process for executing a recipe, including steps of recording a sequence of blend steps and playing back a modified sequence of blend steps.

FIG. 5 is a flow diagram of an illustrative processes illustrated as a collection of blocks in a logical flow graph, which represent a sequence of operations that can be implemented in hardware, software, or a combination thereof. The blocks are organized under entities and/or devices that may implement operations described in the blocks. However, other entities/devices may implement some blocks. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 depicts a flow diagram of an example process 500 for executing a recipe utilizing a stored blend sequence. The process 500 is illustrated as a collection of blocks in a logical-flow graph, which represents a sequence of operations that may be implemented in hardware, software, or a combination thereof. Numbers 502-530 reference the blocks. Each of the operations 506, 510, 516, and 528 represents the processing of a query with two paths for subsequent processing based on an affirmative answer to the query and, alternatively, a negative answer to the query. The process 500 generally includes activities associated with executing a recipe 110 and processing an ingredient or an action. In an example embodiment, the operations illustrated in process 500 may be executed by a recipe application, e.g., recipe application 104.

At operation 502 a user selects a recipe, e.g., recipe 110. The recipe may be stored in the local memory of a computing device, e.g., computing device 102, acquired from an external server, e.g., external server 106, or acquired from some other source. The recipe may include a blend sequence stored with the recipe, and may include measurement data collected during a previous execution of the recipe. The blend sequence and the measurement data may be specific to the user, or common to all users. The blend sequence may be a default blend sequence; may be a blend sequence previously recorded, created or modified by the user; or may be a blend sequence previously recorded, created or modified by another user.

At operation 504, a recipe step is displayed. When operation 504 is executed for the first time, a first recipe step is displayed according to recipe data constituting a selected recipe, e.g., recipe 110. At operation 506, a determination is made whether the displayed recipe step is an action step or an ingredient step. If the recipe step is an ingredient step, e.g., the recipe step is not an action step, execution proceeds to operation 508 at which an ingredient is weighed. In an example configuration, weighing of an ingredient proceeds by prompting the user with the name and target amount of the ingredient and then receiving sensor data from a scale, e.g., scale 106, and providing feedback to the user until the target amount of the ingredient has been added to a container, e.g., blending container 122, on the scale. Once an ingredient has been weighed, at operation 528 a determination is made whether additional recipe steps remain to be executed. If more recipe steps remain to be executed, the process 500 returns to operation 504 at which a next recipe step is displayed. If no more recipe steps remain to be executed, at an operation 530 the process 500 terminates.

If at operation 506 a determination is made that the displayed recipe step is an action step, at operation 510 a determination is made whether the displayed recipe step is a blend action step. If the displayed recipe step is a blend action step, at operation 514 the user is presented with a prompt. In an example configuration of process 500, a prompt requests the user to select to use a stored blend sequence to perform the blend action step, to edit a stored blend sequence to be used to perform the blend action step, or to record a new blend sequence to perform the blend action step. The recipe, e.g., recipe 110 with a blend action step may have a default stored blend sequence, which may have been replaced with a recorded blend sequence created and/or modified by the user or another user. At operation 516, the user makes a decision whether to record a blending sequence. If the user selects to record a blend sequence, at operation 518 a blend sequence is recorded. Example configurations for recording a blend sequence have been described previously with reference to FIG. 2.

Once a blend sequence has been recorded, at operation 520 the blend sequence is stored with the recipe, e.g., recipe 110, replacing any previous stored blend sequence for the recipe, e.g., recipe 110, (or the default blend sequence, if no prior user-recorded blend sequence has been stored). When a blend sequence is stored, additional data may be stored with the recipe 110 as described, including specifically the weight(s) of two or more ingredients added to the recipe mixture. Once the blend sequence is stored, processing continues at operation 528 as described herein.

The recipe, e.g., recipe 110, may have more than one blend action step, and a separate blend sequence may be stored and associated with each blend action step. The user may select a previous stored blend sequence for a first blend action step (or a default blend sequence, if no prior user-recorded blend sequence has been stored for the first blend action step), and for a second blend action step, may select to record a new blend sequence for the second blend action step, or vice versa. Recording a blend sequence for one blend action step in the recipe, e.g., recipe 110, does not require that a blend sequence be recorded for a subsequent blend action step in the recipe. The user may use a private blend sequence for one blend action step and a group blend sequence for a subsequent blend action step.

If at operation 516 the user selects to use or edit a recorded blend sequence, at operation 522 the recipe application 104 selects a blend sequence (either the default blend sequence if no user-generated blend sequence has been stored, or a stored user-generated blend sequence). The user may edit the selected blend sequence, for example using a user interface as shown and described above with reference to FIG. 3. At operation 524, the selected blend sequence may be modified (as will be described herein). At operation 526, the modified blend sequence may be executed to perform the blend action step. Once the modified blend sequence is executed, processing continues at operation 528 as described herein.

If at operation 510 a determination is made that the displayed recipe step is not a blend action step, at operation 512 the recipe application 104 awaits feedback signaling the completion of the displayed action step. The feedback may be from user input; from a sensor built into the scale 106 or the blending apparatus 108; from the lapse of a timer, or from some other means. When the displayed action step is completed, processing continues at operation 528 as described herein.

At operation 524, a selected blend sequence may be modified. Modification of a blend sequence may be accomplished by modifying one or more attributes of one or more blend steps comprising the blend sequence. Modification of a blend sequence may be determined by one or more stored attributes of the specific execution of a recipe, e.g., recipe 110, when the stored blend sequence was recorded, and by one or more corresponding attributes of the current execution of the recipe. For example, when a stored blend sequence is recorded, any of a number of attributes of the execution of the associated recipe may be stored, such as the number of servings, the weight of two or more ingredients in the recipe mixture being blended, the total weight of the recipe mixture being blended, the identity and weight of any ingredient substitutions made when the recipe was executed, and similar attributes of the specific combination of ingredients utilized in the execution. As a further example, if appropriate sensors are available in the computing device 102, the scale 106, and/or the blending apparatus 108, additional parameters of the execution may be stored, including date, time of day, temperature of the environment, temperature of the recipe mixture being blended, temperature of the blending apparatus 108, viscosity of the recipe mixture, density of the recipe mixture, and similar physical attributes of the environment in which the blending occurs and/or the recipe mixture being blended.

Modification of a blend sequence may be further determined by one or more attributes of the specific execution of a recipe, e.g., recipe 110, when the stored blend sequence is modified. In an example configuration, modification of a blend sequence may be determined by comparing a value of an attribute of the current execution of the recipe with the corresponding value of the attribute of the execution of the recipe when the stored blend sequence was recorded. For example, a blend sequence may be modified based on a ratio of a total weight of a recipe mixture being blended in the current execution of the recipe with the total weight of the same recipe mixture in the execution of the recipe when the blend sequence was recorded. As an alternative, a blend sequence may be modified based on a ratio for a specific ingredient of the recipe, of a current weight value and a stored weight value. As a further alternative, a blend sequence may be modified based on the current temperature of the blending apparatus 108 and a stored value for the temperature of the blending apparatus 108. As a yet further alternative, a blend sequence may be modified based on a combination of multiple attributes of the current execution of the recipe and of the execution of the recipe when the blend sequence was recorded.

In an example of operation 524, a blend sequence may be modified by adjusting the duration of one or more blend steps in the blend sequence based on one or more attributes of the blend action step. For example, a blend sequence may be modified based on a total weight of a current recipe mixture being blended and a stored value for the total weight of the recipe mixture when the blend sequence was recorded. A blend sequence may be modified by multiplying the duration of each blend step by the ratio of the total weight of the current recipe mixture and the stored weight of the recipe mixture. As an alternative example, a blend sequence may be modified by multiplying the duration of the final blend step in the blend sequence by the ratio of the total weight of the current recipe mixture and the stored weight of the recipe mixture.

In another example of operation 524, a blend sequence may be modified by adjusting a control parameter of one or more blend steps based on one or more attributes of the blend action step. For example, a blend sequence may be modified based on a total weight of a current recipe mixture being blended and a stored value for the total weight of the recipe mixture when the blend sequence was recorded. In this example, a blend sequence may be modified by multiplying the power setting of each blend step by the ratio of the total weight of the current recipe mixture and the stored weight of the recipe mixture. As an alternative example, a blend sequence may be modified by multiplying the power setting of the final blend step in the blend sequence by the ratio of the total weight of the current recipe mixture and the stored weight of the recipe mixture.

In an example of operation 524, a blend sequence comprising a series of pulse blend steps may be modified by adjusting the number of pulse blend steps based on one or more attributes of the blend action step. For example, the number of pulse blend steps may be modified based on a total weight of a current recipe mixture being blended and a stored value for the total weight of the recipe mixture when the blend sequence was recorded. In this example, the number of pulse blend steps may be adjusted by multiplying the number of pulse blend steps in the stored blend sequence by the ratio of the total weight of the current recipe mixture and the stored total weight of the recipe mixture, then rounding the result up to the next whole integer value.

In another example of operation 524, modification of a blend sequence may be subjected to constraints. For example, modification of a duration of a blend step may be constrained so that no resulting duration is shorter than a specified minimum duration (such as 1 second) nor longer than a specified maximum duration (such as four minutes). As a further example, modification of a power setting of a blend step may be constrained so that no power setting may exceed a specified maximum power setting. Constraints to modification of a blend sequence may be based on attributes of the current or stored blend sequence or the environment in which the blend action step is executed. For example, a maximum duration or a maximum power setting for a blend step may be determined in part by an ambient temperature of a blend environment or a temperature of the blending apparatus 108 at the time a blending is executed.

Figure 6:
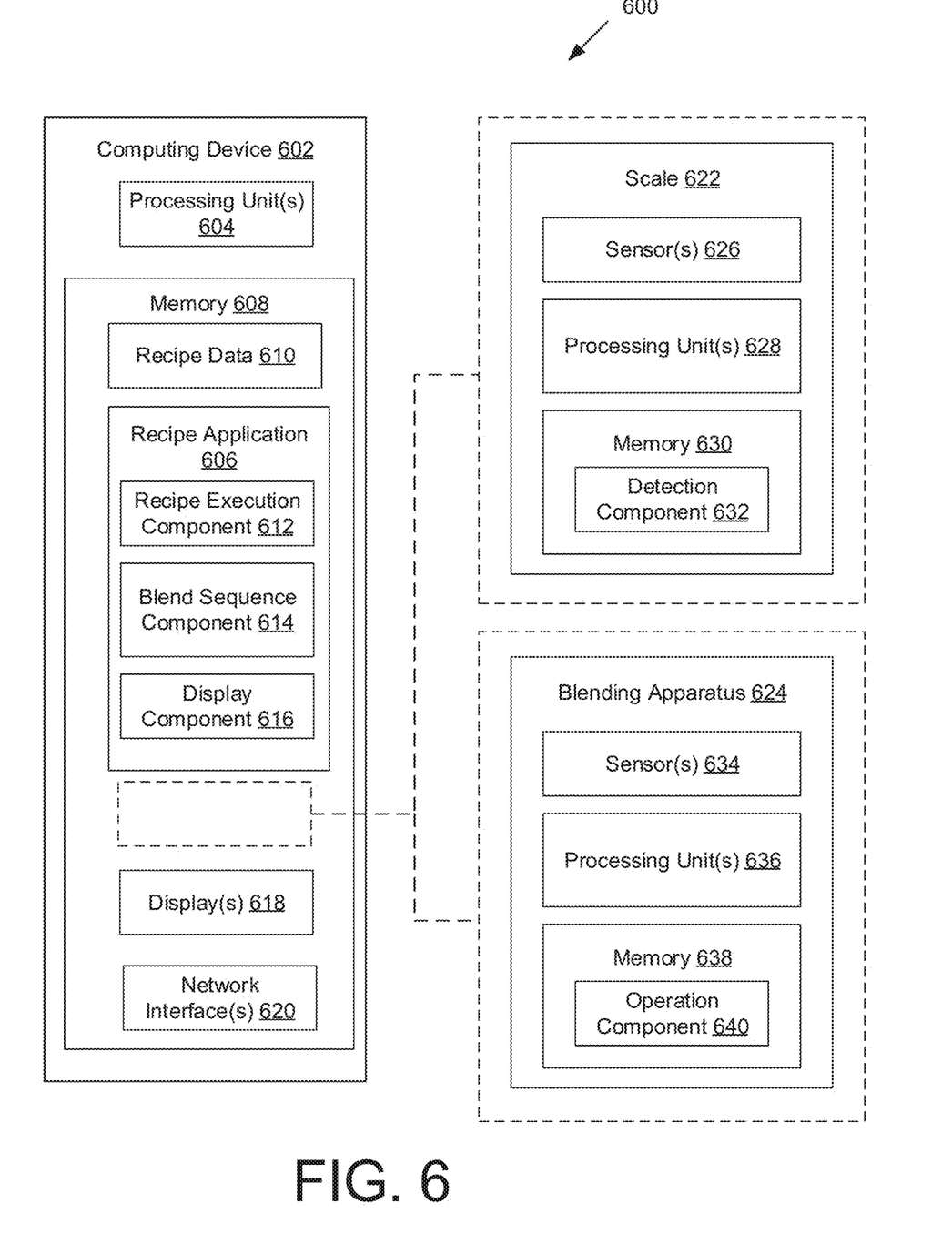
FIG. 6 depicts an example implementation of a system configured to exercise an aspect of the current invention.

FIG. 6 depicts an example of a system 600 configured to exercise aspects of the configurations described herein. A computing device 602, e.g., computing device 102, comprises one or more processing units 604 configured to execute a recipe application 606, e.g., recipe application 104. The computing device 602 comprises memory 608 configured to store data, including recipe data 610 related to a recipe, e.g. recipe 110, and program instructions and data implementing the recipe application 606. The recipe application 606 may comprise a recipe execution component 612 configured to display steps of a recipe, e.g., recipe 110, and to guide a user through the execution of the recipe steps. The recipe application 606 may further comprise a blend sequence component 614 configured to record, display, modify, delete, and execute a blend sequence in accordance with the above description. The recipe application 606 may further comprise a display component 616 configured to present various user interfaces to allow user interaction with and control of the recipe application 606. The computing device 602 may further comprise one or more displays 618 configured to display various user interface elements to facilitate user interaction. The computing device 602 may further comprise one or more network interfaces 620 to communicate with a scale 622, e.g., scale 106, a blending apparatus 624, e.g., blending apparatus 108, a recipe server (not illustrated), e.g., recipe server 106, and other external devices not illustrated.

The scale 622 may be configured to communicate with the computing device 602. The scale 622 may comprise one or more sensors 626, one or more processing units 628, and memory 630. The memory 630 may comprise a detection component 632 configured to detect a weight of an object or an ingredient placed on or added to the scale 622. The detection component 632 may be further configured to communicate with the computing device 602.

As previously noted, the system 600 may further comprise the blending apparatus 624, e.g., blending apparatus 108, configured to communicate with the computing device 602. The blending apparatus 624 may further comprise one or more sensors 634, one or more processing units 636, and memory 638. The memory 638 may comprise an operation component 640 configured to control the operation of the blending apparatus 624. The operation component 640 may be further configured to communicate and/or control the internal state of the blending apparatus 636 with the computing device 602.

Those skilled in the art will appreciate that the architecture described in association with computing devices 102, 602, scales 106, 624, and the blending apparatuses 108, 636 are merely illustrative and is not intended to limit the scope of the present disclosure. In particular, the computing system and devices may include any combination of hardware or software that can perform the indicated functions, including computers, network devices, internet appliances, and/or other computing devices. The computing devices 102, 602, scales 106, 622, and blending apparatuses 108, 624 may also be connected to other devices that are not illustrated, or instead may operate as a stand-alone system. In addition, the functionality provided by the illustrated components may in some configurations be combined in fewer components or distributed in additional components. For example, in some configurations, the computing devices 102, 602 may be incorporated into the scales 106, 622, the blending apparatuses 108, 624, or both. Similarly, in some configurations, the functionality of some of the illustrated components may not be provided and/or other additional functionality may be available.

The one or more processing unit(s) 604, 628 and 636 may be configured to execute instructions, applications, or programs stored in the memory(s) 608, 630 and 638. In some examples, the one or more processing unit(s) 604, 628 and 636 may include hardware processors that include, without limitation, a hardware central processing unit (CPU), a graphics processing unit (GPU), and so on. While in many instances the techniques are described herein as being performed by the one or more processing unit(s) 604, 628 and 636, in some instances the techniques may be implemented by one or more hardware logic components, such as a field programmable gate array (FPGA), a complex programmable logic device (CPLD), an application specific integrated circuit (ASIC), a system-on-chip (SoC), or a combination thereof.

The memory 608, 630 and 638 is an example of non-transitory computer-readable media. Computer-readable media may include two types of computer-readable media, namely computer storage media and communication media. Computer storage media may include volatile and non-volatile, removable, and non-removable media implemented in any method or technology for storage of information, such as computer readable instructions, data structures, program modules, or other data. Computer-readable storage media includes, but is not limited to, random access memory (RAM), read-only memory (ROM), erasable programmable read-only memory (EEPROM), flash memory or other memory technology, compact disc read-only memory (CD-ROM), digital versatile disk (DVD), or other optical storage, magnetic cassettes, magnetic tape, magnetic disk storage or other magnetic storage devices, or any other non-transitory or non-transmission medium that may be used to store the desired information and which may be accessed by a computing device. In general, computer storage media may include computer-executable instructions that, when executed by one or more processing units, cause various functions and/or operations described herein to be performed.

Additionally, a computer media includes data stored within a modulated data signal. For example, a computer media may include computer readable instructions, data structures, program modules, modulated carrier waves, other modulated transmission mechanisms, etc. However, as defined herein, computer storage media does not include communication media. Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated environment 600. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from computing device 102, scale 106, and/or blending apparatus 118 may be transmitted to user computing device 102, scale 106, and/or blending apparatus 108 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium.

Additionally, the network interface(s) 620 include physical and/or logical interfaces for connecting the respective computing device(s) to another computing device or network. For example, the network interface(s) 620 may enable WiFi-based communication such as via frequencies defined by the IEEE 802.11 standards, short range wireless frequencies such as Bluetooth®, or any suitable wired or wireless communications protocol that enables the respective computing device to interface with the other computing devices.

The architectures, systems, and individual elements described herein may include many other logical, programmatic, and physical components, of which those shown in the accompanying figures are merely examples that are related to the discussion herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
    a scale;
    a blending apparatus;
    a computing device comprising at least one processor, at least one user interface, and a memory;
    the memory including computer-executable instructions that, when executed, cause the processor to:
        on a first occasion of executing a recipe:
            render, on the user interface, the recipe indicating at least one ingredients and at least one blend action;
            receive, from the scale, a first weight measurement of the at the least one ingredients;
            record a blend sequence for the blending apparatus; and
            associate the first weight measurement and the blend sequence with the recipe; and
        on a second and subsequent occasion of executing the recipe:
            render, on the user interface, the recipe indicating the at least one ingredients and the at least one blend action;
            receive, from the scale, a second weight measurement of the at the least one ingredients;
            based at least in part on the first weight measurement and the second weight measurement, modify the blend sequence to provide a modified blend sequence; and
            cause the blending apparatus to execute the modified blend sequence.

2. The system of claim 1, where record the blend sequence comprises storing, for each step of the blend sequence, a temporal duration and a value of at least one operating parameter received from the blending apparatus as the blending apparatus is operated.

3. The system of claim 1, where record the blend sequence comprises measuring and storing, for each step of the blend sequence, a temporal duration and one of a constant value or a temporal sequence of values of at least one operating parameter received from the blending apparatus as the blending apparatus.

4. The system of claim 1, where record the blend sequence comprises creating, by a user using an interface on the computing device, a sequence of one or more steps, each step stipulating a temporal duration and a value for at least one operating parameter of the blending apparatus.

5. The system of claim 1, where record the blend sequence comprises creating, by a user using an interface on the computing device, a sequence of one or more steps, each step stipulating a temporal duration and one of a constant value or a temporal sequence of values for at least one operating parameter of the blending apparatus.

6. The system of claim 2, wherein modify the blend sequence comprises adjusting the duration of each step of the sequence in accordance with a ratio of the second a weight measurement to the first a weight measurement.

7. The system of claim 2, wherein the blending apparatus comprises a blender.

8. The system of claim 7, wherein the operating parameter of each step of the blend sequence comprises a rotatory speed of the blender, and modify the blend sequence comprises adjusting the rotatory speed of the blender in accordance with a ratio of the second weight measurement to the first weight measurement.

9. The system of claim 7, wherein the blender comprises the scale.

10. The system of claim 9, wherein the blender comprises the computing device.

* * * * *